Oct. 27, 1925.
G. H. HARRIS
VALVE
Filed April 12, 1922
1,559,044
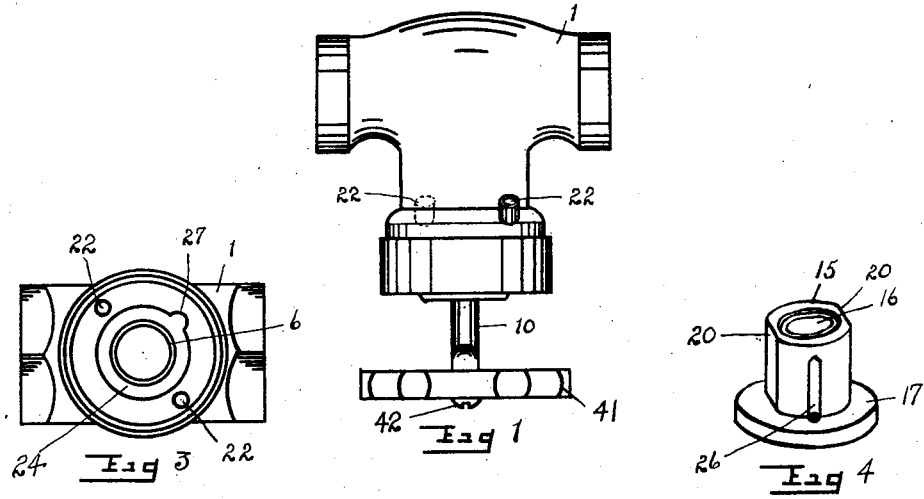
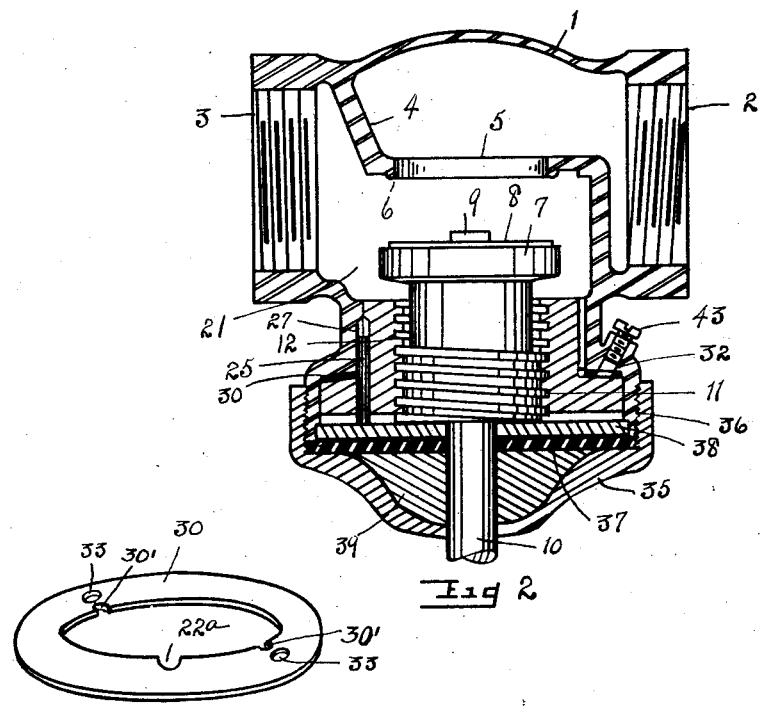
INVENTOR.
George H. Harris
BY
Thomas L. Wilder
ATTORNEY.

Patented Oct. 27, 1925.

1,559,044

UNITED STATES PATENT OFFICE.

GEORGE H. HARRIS, OF UTICA, NEW YORK, ASSIGNOR TO UTICA VALVE & FIXTURE COMPANY, OF UTICA, NEW YORK, A CORPORATION OF NEW YORK.

VALVE.

Application filed April 12, 1922. Serial No. 551,845.

*To all whom it may concern:*

Be it known that I, GEORGE H. HARRIS, a citizen of the United States, residing at Utica, in the county of Oneida and State of New York, have invented certain new and useful Improvements in Valves, of which the following is a specification, reference being had therein to the accompanying drawing.

My invention relates to a compression stop and waste valve and I declare the following to be a full, clear, concise and exact description thereof sufficient to make and use the same reference being had to the accompanying drawings in which like reference characters refer to like parts throughout the specification.

The object of the invention is to provide a valve that will embody a compression stop and shut off and be adapted to drain all water from the valve casing and piping on that side of the valve opposite the pressure, immediately said valve has been closed, whereby to prevent the waste water from freezing and injuring the parts of the valve, casing and piping. This act of draining the valve casing and piping immediately the valve has been closed, is accomplished in an automatic manner and without any other movement of parts than that of turning the valve stem to shut off position. Furthermore, the parts of the valve and the automatic feature are arranged in such manner that no lubrication is necessary to keep them from sticking as heretofore.

Moreover, the waste water outlets formed in the valve casing are located in such manner that the water can be drained from the lowest part of the valve casing and piping from any position in which said casing is disposed when connected to the piping, except when the valve stem is standing in vertically upright position or disposed at an acute angle to the vertical.

The object will be understood by referring to the drawings in which:

Fig. 1 is a side elevation of the valve;

Fig. 2 is an enlarged vertical section of the valve, showing parts in full lines;

Fig. 3 is a detail plan view, looking from beneath of the valve casing employed;

Fig. 4 is a detail perspective view of a threaded sleeve used;

Fig. 5 is a detail perspective view of a washer used.

Referring more particularly to the drawings, the valve casing is represented by 1 and has the usual screw threaded apertures 2 and 3 for connecting the casing to the inlet and outlet pipes, or supply and distributing pipes, not here shown. A partition 4 is disposed within casing 1 and is equipped with an opening 5. A valve seat is formed at 6 and is adapted for the reception of valve 7 carrying a fabric or composition washer 8, which is held in place by a headed nut 9 that is screw threaded to the body of the said valve 7.

Valve stem 10 is equipped with screw threads 11 adapted to turn in threads 12 formed in the longitudinally movable sleeve 15, which has a central aperture 16 and flanged part 17 at its lower end. The opposite peripheral surfaces of the upper part of sleeve 15 are flattened or cut off straight at 20, 20, whereby to provide passageways connecting the chamber 21 with the drain outlets 22, 22, made in casing 1, when said sleeve 15 is in its lowermost position. The drain outlets 22, 22, will be closed when sleeve 15 is in its upper position illustrated in Fig. 2. Outlets 22, 22, that are made in casing 1 are disposed diametrically opposite to each other and in such manner as to drain the lowest part of chamber 21 from any position in which casing 1 is disposed, when mounted to connecting pipes, not shown, except when the valve stem is in vertical upstanding position or disposed at an acute angle to such position.

A pin 25 loosely fits in an aperture 26 made in sleeve 15. The upper part of said pin 25 is adapted to engage also in a recess 27 formed in casing 1, whereby to prevent said sleeve 15 from turning, although allowing it to slide along pin 25, whereby to move longitudinally.

A fabric or composition washer 30 forming a waste valve seat is disposed in a tight fitting manner against the surface of the shoulder 32 of casing 1 and is adapted to form a cushion between the contiguous surface of the shoulder 32 and the upper surface of flange 17 of sleeve 15, when said sleeve 15 is in upper position or seated to close the outlets 22, 22. Washer 30 has two apertures 33, 33 formed therein which are adapted to aline with outlets 22, 22, whereby the waste water is able to pass therethrough. Recesses 30' are made in washer 30 to align with passageways 20. Pin 25 will pass through open aperture 22ª made in washer 30 to hold apertures 33 in alinement with outlets 22.

The lower part of casing 1 is enclosed by a metallic cap 35 that is screw threaded at 36 to casing 1. A fabric or composition washer 37 is placed between the outer end of casing 1 and cap 35, whereby to aid in preventing any leakage at that location. A metal washer 38 is mounted just above washer 37. Moreover, a felt washer or packing 39 is disposed within the chamber formed by cap 35 and about the lower part of stem 10 of valve 7, whereby to aid in preventing any leakage at that location.

Wheel 41 having a square shaped aperture at its hub is mounted to the angled lower free end of stem 10 and is held in place by a screw bolt 42, whereby to aid in turning said stem 10.

In operating the valve, the user will turn the stem 10, whereby to force the valve 7 upward against its seat 6, in order to close said valve. Immediately, the valve 7 has been seated the continued turning of the stem will force sleeve 15 downward away from waste seat washer 30 and against metal washer 38 and, thereby, open up an annular chamber between the upper surface of flange 17 of sleeve 15 and the under surface of washer 30, whereby to allow the waste water in chamber 21 and piping therebeyond to drain through the passage-ways provided between the flat surfaces 20 of the sleeve and the casing 1 to the outlets 22, which may be connected to a drain pipe. However, in some instances a drain pipe is not used, the waste water being allowed to drain on the adjacent ground. When the valve is opened again, the threads 11 of the valve stem 10 will work through the threads of sleeve 15 until the shoulder formed on valve stem 10 comes in contact with the metal washer 38, at which time the longitudinal travel of the stem 10 is stopped. The further turning of the stem 10 will cause sleeve 15 to move longitudinally against the washer 30, whereby to close the outlets 22, 22.

Ordinarily, only one outlet 22, will be connected to a drain pipe, not shown, the other being closed by a threaded plug 43.

In the event that it should be desirable to use the valve without the automatic waste feature, both outlets 22, 22, may be closed by screw plugs 43, 43.

The valve casing 1 may be disposed at most any angle to suit the exigencies of the location. It will be noted, therefore, that in any position of the casing 1 in which the valve stem 10 is disposed from vertical downwardly extending position to horizontal, one of the outlets 22 will be able to drain the lowermost part of chamber 21 of casing 1, as well as the connected piping.

Having thus described my invention what I claim as new and desire to secure by Letters Patent is:

In a valve, a valve casing having a valve seat therein and a waste outlet, a valve having an externally threaded portion adapted to be turned so as to be moved toward and from its seat, an internally threaded sleeve held from rotatable movement and adapted to be moved longitudinally by the turning of said valve for controlling the discharge of waste water through the waste outlet, said sleeve having its opposite peripheral surfaces cut off straight to provide passages for the waste water to the outlet.

In testimony whereof I have affixed my signature.

GEORGE H. HARRIS.